United States Patent [19]
Alexander

[11] Patent Number: 4,988,254
[45] Date of Patent: Jan. 29, 1991

[54] VEHICLE RESTRAINT

[75] Inventor: James C. Alexander, London, Canada

[73] Assignee: Serco Corporation, Ontario, Canada

[21] Appl. No.: 232,833

[22] Filed: Aug. 16, 1988

[51] Int. Cl.⁵ .............................................. B65G 69/00
[52] U.S. Cl. .................................... 414/401; 414/396; 414/584
[58] Field of Search ............... 414/400, 401, 396, 584; 410/18, 9, 19, 22, 7, 77, 56, 51; 14/71.7

[56] References Cited

U.S. PATENT DOCUMENTS

| | | | |
|---|---|---|---|
| 4,114,718 | 9/1978 | Lipshield | 410/77 X |
| 4,472,099 | 9/1984 | Hahn et al. | 414/401 |
| 4,589,813 | 5/1986 | Hagen et al. | 414/396 X |
| 4,695,216 | 9/1987 | Erlandsson | 414/396 X |
| 4,759,678 | 7/1988 | Hageman | 414/396 X |

FOREIGN PATENT DOCUMENTS 265004 6/1964 Netherlands ........................ 414/401

OTHER PUBLICATIONS

Nova Technology Truck Lock Publication.

Primary Examiner—Frank E. Werner
Attorney, Agent, or Firm—Sughrue, Mion, Zinn, Macpeak & Seas

[57] ABSTRACT

A vehicle restraint mountable against a dock face uses a linearly extensible actuator member to move a flat plate restraining device into a vehicle release or restraint position. The plate carries a bracket having a cam profile which via a connection or latch arm converts the linear movement of the drive member into rotational movement of the restraining plate. In the vehicle restraining position all loading on the restraining device is transmitted to the frame without any force component on the actuator.

21 Claims, 5 Drawing Sheets

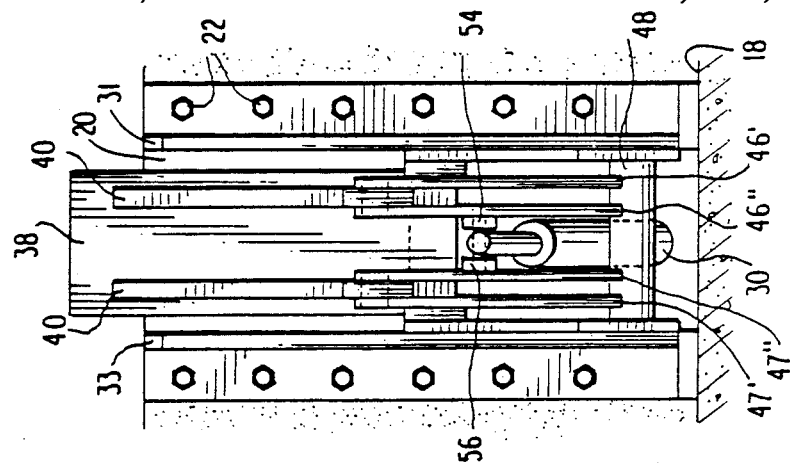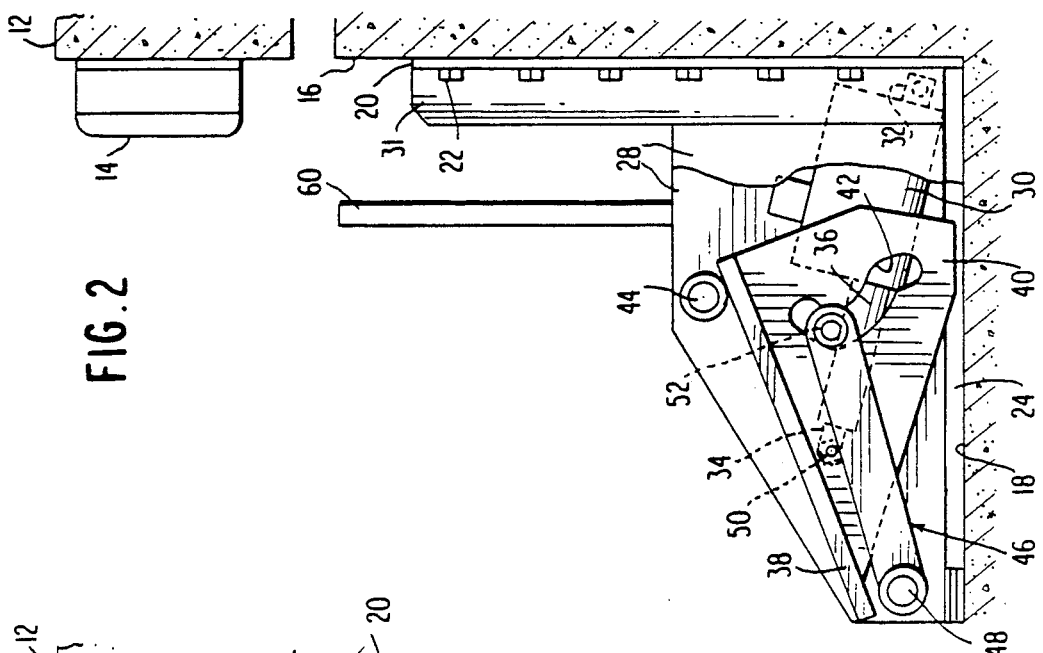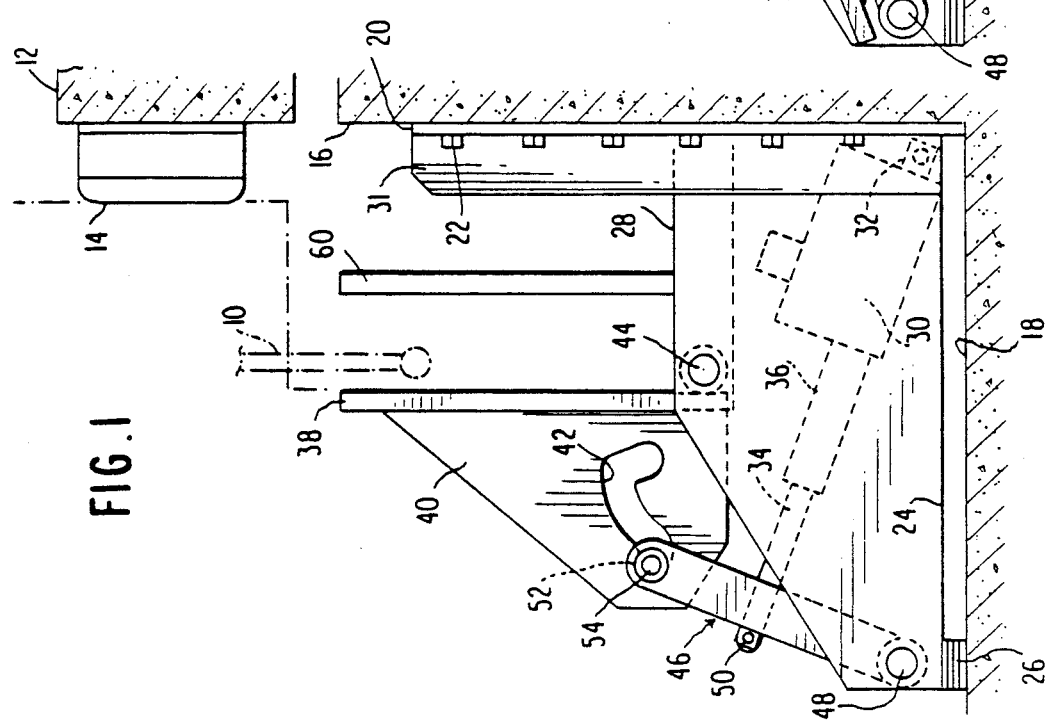

VEHICLE RESTRAINT

BACKGROUND OF THE INVENTION

This invention relates to a device to hold a vehicle to a loading dock. In particular, it relates to a device that prevents vehicle movement away from a loading dock as loading and/or unloading operations of the vehicle occur.

The traditional manner of restraining a vehicle so that it does not move during loading operations is to use wheel chocks. While inexpensive and generally efficient, they are dependent on the operator and must be properly placed to eliminate vehicle creep. The tendency to move in small increments that over a protracted loading operation may result in a significant distance between the back of the truck and the dock face. Additionally, in some conditions, such as ice and snow, they may slide.

Given these problems with wheel chocks, a variety of devices have been proposed and placed into commercial use that affirmatively grab onto a portion of the truck. The most popular part to grab is the vehicle ICC bar, which by regulation must be placed in a specific location range under the rear of the vehicle. While offering some improvements over vehicle chocks, these devices are more expensive and introduce a new set of engineering problems. First is that as the vehicle is unloaded it tends to float, that is upward movement of the truck bed. The vehicle restraint must be able to accommodate such movement. The converse case of vehicle loading also presents a problem since the device must have sufficient range so as not to lock up under such downward force. Movement toward and away form the dock must also be accommodated. The ICC bar may be placed within a range from the rear of the truck and any device requires operating space. Thus, a so-called capture range exists where the device will engage the ICC bar. The device must however function in such a manner to grab the bar yet not have excessive play that allows the truck to move away from the dock.

U.S. Pat. No. 4,146,888 deals with an attempt to utilize an hydraulic device secured to the dock floor having a securing element coupled to the truck bed. The device requires a self-alignment of the hydraulic cylinder to be mounted on the dock unit and also uses an attaching hook carried by the piston exposed portion and having an end adapted to be releasably connected to the truck. Similarly. U.S. Pat. No. 4,191,503, which is an extension on the technique, requires a locking assembly which is elongated having a frictional member and manually actuated means, that is the handle for moving the frictional member. Neither of these devices grab onto the ICC bar. They tend to interfere with loading operations and may not work on a wide variety of trucks.

U.S. Pat. No. 4,208,161 illustrates a device to lock on to a vehicle ICC bar. The device is mounted to the dock face and employs a hook element hingedly moved into an upward engagement position. The device is operated at dock level and cannot accommodate vehicle float during loading and unloading operations.

The next generation of vehicle restraints that grabbed the ICC bar are represented by patents that use the concept of utilizing a carriage which is mounted on the dock face for vertical movement which carried a rotating hook. Thus, U.S. Pat. No. 4,264,259 defines such a carriage having first and second sections and the hook again defined as having a distal portion to interlockingly engage a portion of the parked vehicle. The vertically movable carriage compensates for float and accommodates vehicle ICC bars of different sections. U.S. Pat. No. 4,379,354 represents another example of a carriage type device. U.S. Pat. No. 4,267,784 is a variation of the manual device of the '161 patent but defines a specific locking arrangement and actuating member. Thus, the device employs a plurality of selective operative positions with the lock component having a plurality of annularly spaced pockets.

Further patents using the vertically movable carriage principle are U.S. Pat. No. 4,282,261 which defines a commercial device marketed by Rite-Hite Corporation under the name "ADL". This device has the motor for actuating the engaging hook carried on the vertically moving carriage. A problem with this type of device is that the rearward movement of the truck is employed to drive the carriage down as the ICC bar slides along a ramp surface. If the truck backs down too fast the carriage may be bent jamming the hook. Also, the ICC bar itself may be bent due to contact with the carriage. U.S. Pat. Nos. 4,373,847 and 4,443,150 deal with the manual vehicle locking configurations. These devices offer simplicity but sacrifice device range. U.S. Pat. Nos. 4,472,009 and 4,560,315 are variations of the carriage carrying a rotating hook.

U.S. Pat. No. 4,630,989 represents a different design system to the vehicle restrain problem. That system employs a pivotal bar mounted on vertically extending frame members so that it extends into a vertical position from a generally horizontal position. The bar is actuated by means of an hydraulic cylinder which is secured to mounting bracket 30. When hydraulic pressure is released, the return springs cause retraction of the bar.

In the device of the '989 patent, the hydraulic cylinder is secured adjacent the forward end of the horizontal bearing face 14 and pivotally secured to the pivotal locking bar so that it is angled rearwardly toward the vertical securing face.

U.S. Pat. Nos. 4,888,325 and 4,647,951 deal generally with different types of structures having rather complicated linkages to effectuate locking and unlocking. In the case of the '325 patent, a slide mechanism is used which employs a rack and pinion for purposes of effectuating a linear upward movement of the slide. In the '941 patent, defines a parallelogram type linkage which pivotally interconnects the frame for purposes of moving the engaging member into and out of its operative position. These devices, while offering extended range, do so using complicated linkages that are not suited for the dirty, open environment of a loading dock.

U.S. Pat. No. 4,695,216 describes a device having a slide for the ICC bar, the slide having a recess disposed inwardly in a direction toward the supporting structure. When the ICC bar interacts on the slide, it engages an inclined surface to wedge the slide downwardly against the force of a biasing means to effect engagement with the ICC bar and with the recess.

A different design approach is found in U.S. Pat. Nos. 4,400,127 and 4,555,211 relate to the commercial line of restraints made by Serco under the name AVR 100-300. Those devices use a pair of independently rotated arms, each carrying a series of staggered teeth, the arms spring, pneumatically or hydraulically actuated. Since the teeth will engage at a different location with respect to the dock face the truck will be held in position at a distance closest to the dock. The pneumatic operation accommodates float. These devices while offering advantages still are mounted on the dock approach and have limitations in range.

SUMMARY OF THE INVENTION

Given the problems of prior art devices, it is an object of this invention to design an improved vehicle restraint that offers extended capture range.

It is a further object of this invention to provide for an improved device that is reliable easy to install, maintain and use and accommodates a wide range of vehicle ICC bar configurations.

In accordance with this invention, the device rests on the approach and is fastened to the dock face. A welded locking arm structure pivots about a pin and is actuated by a linear actuator such as a reciprocating screw. In its retracted position the locking arm is housed within the stationary frame. The locking arm carries on its underside a bracket having a cam profile cut therein. An actuating arm coupled to the actuator device and pivoted about the frame is journaled so that it follows the cam profile. In operation, when the linear actuator is advanced, the arm pivots so that the roller confined at one end within the cam structure causes the locking arm to follow and rotate to the vertical locked and upright position. In that upright position, the ICC bar of the truck is restrained from movement away from the dock by the locking arm.

Given the cam and actuating arm structure, any force applied to the locking arm is directed into the frame and not borne by the actuating mechanism. The device employs a pair of actuating arms both coupled to a common center-mounted actuating device. While only a single locking arm structure is employed it is supported by a pair of brackets each coupled to an actuating arm which are then coupled to the actuator. The device also employs, if necessary, a sensing arm to determine when the ICC bar of the truck has reached its desired position so that automatic operation, if desired, may ensue.

These and other objects of this invention will be described in detail by referring to the attached drawings and the description of the preferred embodiment that follows.

BRIEF DESCRIPTION OF THE DRAWINGS

FIG. 1 is a schematic side view of a first preferred embodiment of this invention in the vehicle restraining position;

FIG. 2 is a schematic side view of a first preferred embodiment of this invention in the vehicle release position;

FIG. 3 is a schematic front view of the first preferred embodiment of this invention in the vehicle restraining position:

DESCRIPTION OF THE PREFERRED EMBODIMENTS

Figure 4:
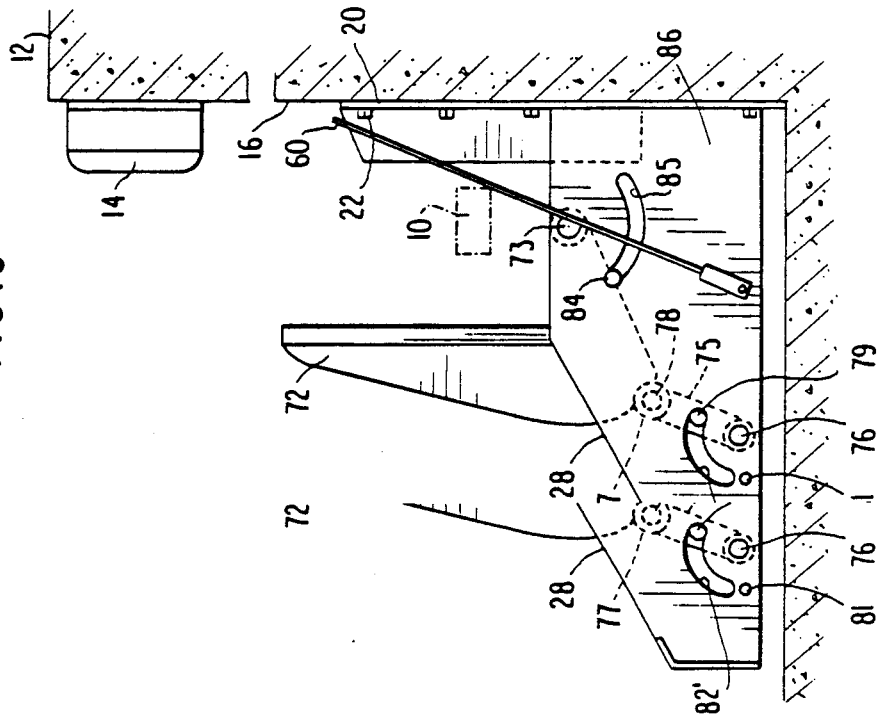
FIG. 4 is a side view of a second preferred embodiment of this invention in a release position.

Referring now to FIGS. 1, 2 and 3, the first preferred embodiment of this invention will be described.

The invention pertains to securing a vehicle having an ICC bar 10 which is generally attached to the rear of the vehicle projecting downward from the truck bed. As the vehicle is backed into a loading dock 12, the rear portion of the vehicle generally strikes and comes to abut against a bumper 14. The bumper 14 is mounted on the dock face 16 at a height of generally about 48 inches above grade level 18. As depicted in FIGS. 1 and 2, the dock 12 and grade 18 are generally a concrete material although, depending on the state of repair and the like the approach 18 may be asphalt or even gravel.

In accordance with this invention a frame plate 20 is mounted to the dock face 16 via a series of bolts 22. It will be appreciated that the technique of anchoring the plate 20 to the dock face is a matter of design choice dependent on the construction of the dock face 16 and the materials needed to achieve the best holding. The device is essentially totally supported from the dock face. The frame comprises a lower section 24 resting on the approach 18. As needed, a series of shims 26 may be employed to level the frame should the approach 18 have a slightly downward grade from the dock face 16. Thus, depending on the application, for example a deteriorating dock face, the device can be mounted to the approach (pit floor). The frame further comprises a pair of outwardly extending side plates 28 and a pair of vertical plates 30, 32 to which the side plates are affixed.

Disposed centrally in the frame is an actuating device 30 which is preferably an electro-mechanical linear actuator of the reciprocating screw type. The actuator may also be a pneumatic or hydraulic cylinder. The device may also be manually actuated using pulleys, cables and counterweights. The actuator 30 is anchored to the frame by means of a flange 32 and has a telescoping arm 34 projecting from the cylinder 36.

A restraining arm 38 has attached to it a supporting bracket 40. Cut into the bracket 40 is a cam profile 42. The restraining arm 38 and bracket are pivoted on the frame members 28 by means of a pivot pin 44. By pivoting around pin 44, the restraining plate 38 rotates from the upright vehicle engaging position illustrated in FIG. 1 to the generally horizontal vehicle release position illustrated in FIG. 2. This rotational motion of the restraining member is accomplished by translating the linear extension of the actuator 30 via a pair of actuating arms 46. As illustrated in FIG. 3, the actuating arm 46 comprises a pair of plates 46' and 46" which sandwich the bracket 40. The actuating arm 46 is pivoted to the frame member 28 via a pivot pin 48. The arm 46 is coupled to the linearly extending arm 34 of the actuator 30 via pin 50. A roller 52 journaled on pin 54 is used to join the actuator arms 46' and 46" to the bracket 40. The roller protruding through the bracket cam profile is used to define a follower arm which translates the linear extension of member 34 into rotational movement of the bracket by having the roller follow the cam profile 42.

As illustrated in FIG. 3, the linear actuator 30 is centered between the actuating arm defined by the pair 46' and 46" and a second pair, 47' and 47". The pivot point 50 is defined by a pin extending through the end of the arm 34 into the two journaled terminals 54 and 56. Thus, by linear outward movement of the arm 34, arms 46 and 47 pivot about pin 48 so that the roller 52 in the cam profile 42 causes a corresponding up or downward movement of the restraining member 38.

FIG. 1 illustrates a sensor 60 which is used to determine whether the ICC bar 10 is in place. That is, the truck, not shown, will back toward the dock face 16 until the ICC bar 10 strikes or comes into the proximity of sensor 60. At this point, if automatic operation is to be effectuated, the actuator for the device 30 would then cause the arm 34 to extend causing the restraining plate 38 to rotate into the upright position illustrated in FIG. 1.

A pair of switches can be used to determine whether the actuating member 38 is either in its fully extended vehicle restraining position, as illustrated in FIG. 1, or in its vehicle release position, illustrated in FIG. 2. As illustrated in FIG. 2, in the vehicle release position, the member 38 is enclosed within the frame members 28 so that it does not protrude out beyond the frame. The limit switches, in addition to providing a signal indicative of the position of the member 38 can also be used to control the actuator 30 and to control indicator lights, not shown, which are used to provide a display to the dock attendant and to the driver as to the status of the lock.

In operation, the device is normally in the retracted position illustrated in FIG. 2. That is, member 38 is in a lowered position generally confined within the frame 28. In this position the device has a minimum height from the ground and a smooth profile which prevents debris from entering the actuating mechanism. Such is important given the litter and generally contaminated nature of the dock area. When a truck is backed into the dock, the ICC bar 10 will normally be located within an area approximately 9 inches in front of the dock bumper 14 and from 14 to 30 inches above the ground. It is this envelope which defines the "capture range" for the ICC bar 10.

The vehicle restraint may be actuated either automatically or by the dock attendant depending on the control method which is employed. The actuating device 30 once energized, causes members 46 and 47 to rotate about pin 48. Such counterclockwise rotation causes a roller 52 in the cam profile 42 to effectuate rotational movement of the restraining member 38 about the pivot point 44. Member 38 is therefore rotated into the vertical, locked position illustrated in FIG. 1. At this point, the ICC bar 10 is trapped behind the arm 38 and thus the vehicle is restrained from moving away from the dock.

The profile of the cam member 42 is designed to effectuate movement of the arm 38 so that the maximum force available to lock the arm increases to a maximum rated load of the structure as a locking arm approaches the vertical locked position. This is important since if the ICC bar 10 is displaced slightly to the left of the position illustrated in FIG. 1, the device of this invention has the necessary power to draw the truck a short distance to the right, into position. Such is a fundamental improvement over rotating hook devices and other techniques which wrap around or otherwise engage the bar since those devices would fail to engage unless it could fully clear the ICC bar 10.

When the locking arm 38 is in the vertical locked position illustrated in FIG. 1, the cam profile 42 is perpendicular to the actuating arms 46 and 47. Thus, the roller 52 is positioned in a detent of the cam profile which provides a positive locking action. If the truck tends to then back away from the dock face 16, that is generally to the left, as illustrated in FIG. 1, any force applied to the restraining member 38 is therefore transmitted via members 46 and 47 to the frame members 28. That is, none of the forces are transferred to the actuator 30. Again, such is an important advantage in this invention since the actuator 30 is isolated from potentially destructive forces.

By doubling up the locking arm assembly to provide two cam surfaces 42, a pair of actuator rollers 54 and 56', extra support for lower stresses in the components is provided. At the same time, this allows the actuating arms to follow in a more compact envelope.

Figure 5:
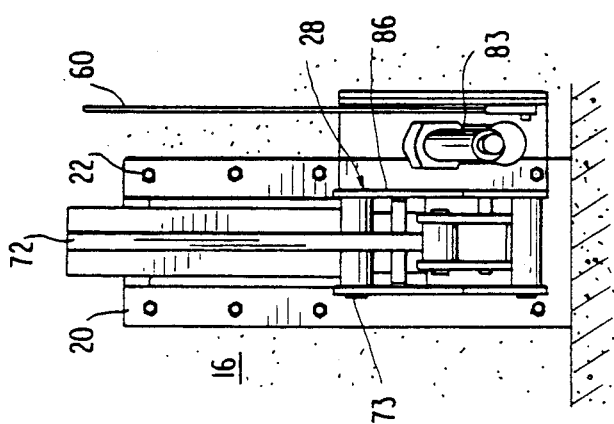
FIGS. 5-6 are front and side views respectively of the second embodiment in the vehicle restraining position.
Figure 6:
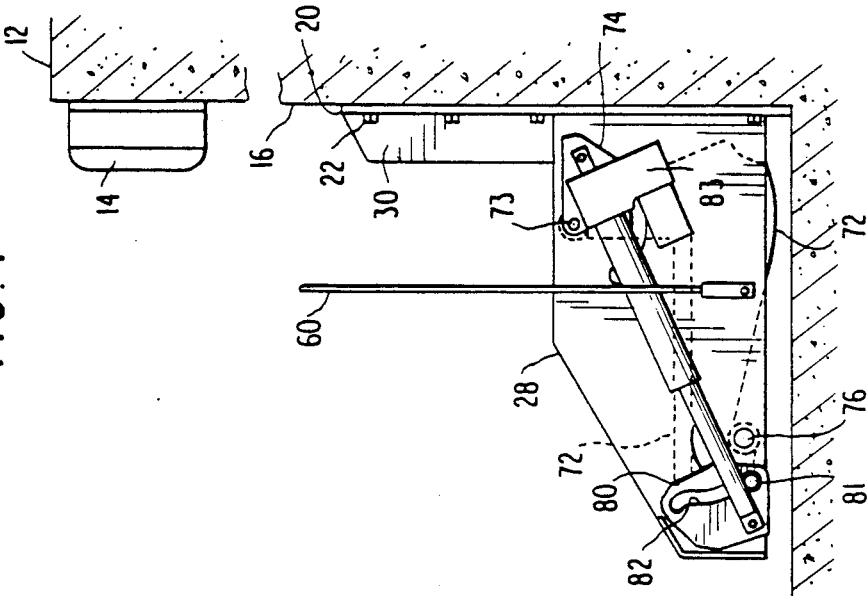

Referring now to FIGS. 4, 5, and 6, a second preferred embodiment of this invention is depicted. In these figures, like numerals are used to identify like components in the first embodiment. FIG. 4 is a side view of the second embodiment in the stored position with cover plates removed for purposes of clarity to identify elements within the housing. FIG. 5 is a front view of the device in the locked or vehicle restraining position with certain linkages removed for purposes of clarity. FIG. 6 is a side view of the second embodiment illustrated in FIG. 5 with the cover plates, actuator and certain linkages removed for purposes of illustration.

In FIGS. 4–6, a welded, stationary frame structure 28 is mounted to the dock wall by means of bolts 22. While not shown, the device may be shimmed at the front to be supported by the driveway. A zone of clearance exists between the approach and the lower portion of the housing.

A locking arm structure 72, illustrated in the retracted position in FIG. 4, comprises a supporting bracket and restraining arm structure similar to that of the first embodiment. This locking arm structure pivots about a pin 73. Pivot pin 73 attaches the locking arm 72 to the frame 28.

Element 74 is a level arm attached to the locking arm 72. A latch arm 75 is pivoted about a pin 76 which is attached to the frame 28. A roller 77 is positioned at the end of the latch arm 75 and pivots via a pin 78. A cam follower 79 comprises a roller mounted on the latch arm 75. A latch cam 80 has a cut-out 82. The cam follower 79 is mounted in the cut-out. The latch cam 80 rotates about a latch cam pivot pin 81.

An actuator device 83 is preferably an electro-mechanical linear actuator of the reciprocating screw type. It, however, may be a pneumatic or hydraulic cylinder or a mechanical system as in the first embodiment. The actuator device 83 is mounted in a "floating" position having an inner end coupled to the lever arm 74 and the outer end coupled to the latch cam 80.

A pin 84 (See FIG. 6) passes through a slotted hole in the side plate connecting the lever arm 74 to the locking arm 72.

In operation, the device is normally stored as illustrated in FIG. 4, with the sensing arm 60 in an upright position. This configuration allows the mechanism to have a maximum height of 14 inches from the ground. As can be appreciated, the low profile is advantageous to accommodate ICC bar 10's various dimensions. When a truck backs into the dock, ICC bar 10, mounted to the back of the truck will normally be located in an area within 9 inches of the dock bumpers 14 and from 14 to 30 inches above the ground, the embodiment of FIG. 4 will be actuated either automatically by means of the sensing arm 60 or by a dock attendant, depending on the method of control employed. The actuating device 83 is, as mentioned, preferably an electro-mechanical linear actuator, typically a reciprocating screw. Within the purview of this invention, however, the actuator can be a pneumatic or hydraulic cylinder or manual. The actuator is located in the housing which is separated from the locking arm 72 by one of the side plates of the frame 28. This side plate 29 is illustrated in FIG. 5.

The actuator 83 is attached at its innermost or rear portion to the lever arm 74 which has a pin 84 passing through a slot 85 in the side plate 86 of the frame 28. The pin 84 engages the locking arm 72. Such is illustrated in FIG. 6.

The actuator 83 is attached at its outer or front end to the latch cam 80. The latch cam 80 rotates about a pin 81 fixed to the frame 28 and engages a cam follower roller 79 which is mounted on a pin passing through a slot 82' in the side plate 86 of the frame 28. The cam follower roller 79 engages the latch arm 75. Thus, as illustrated in FIG. 4, the actuator 83 is not fixedly mounted to any frame element but rather, is mounted between two movable elements, lever arm 74 and latch cam 80.

The shape of the cam slot 82 in the latch cam 80 is designed to provide the loads required to lift the locking arm 72 through all positions, yet make maximum use of the limited stroke of the actuator 83. A high load on the latch cam 80 is required at the start of travel from the stored position illustrated in FIG. 4 and FIG. 5 when the effective movement of the actuator about the pin 73 is reduced. As the locking arm is partially raised (See FIGS. 7(a) and 7(b)), the moment about pin 73 increases and the load on the latch arm 75 is reduced. When the locking arm reaches the final vehicle restraining position illustrated in FIGS. 7(c) and 8(c). latch cam 80 is shaped to provide a higher force on the latch arm 75 so that it engages the locking arm 72. In the fully raised position, the latch arm roller 77 engages a recess or contour 72 in the locking arm 72 to provide a positive stop or a lock for the device.

Figure 7C:
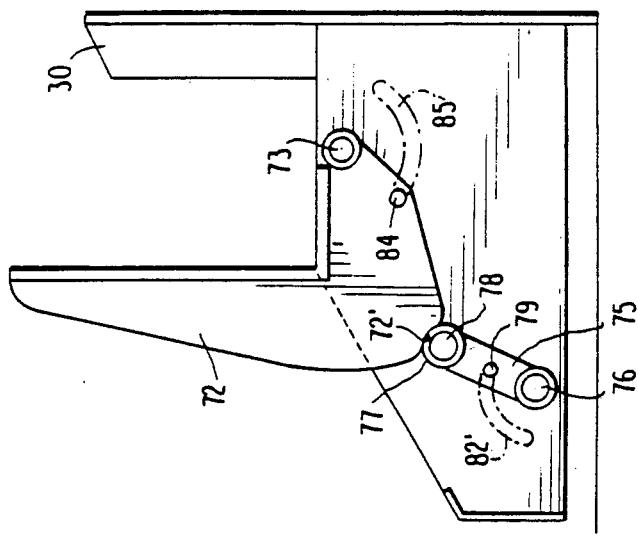
FIGS. 7(a)-7(c) and 8(a)-8(c) are schematic side views with components removed to illustrate operation of the second preferred embodiment.
Figure 7B:
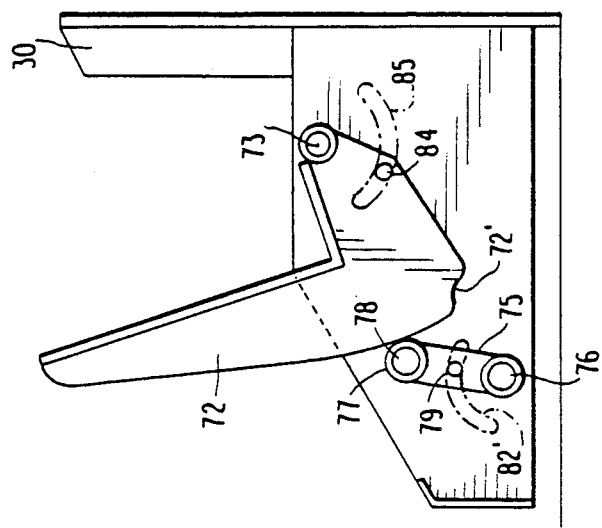
Figure 7A:
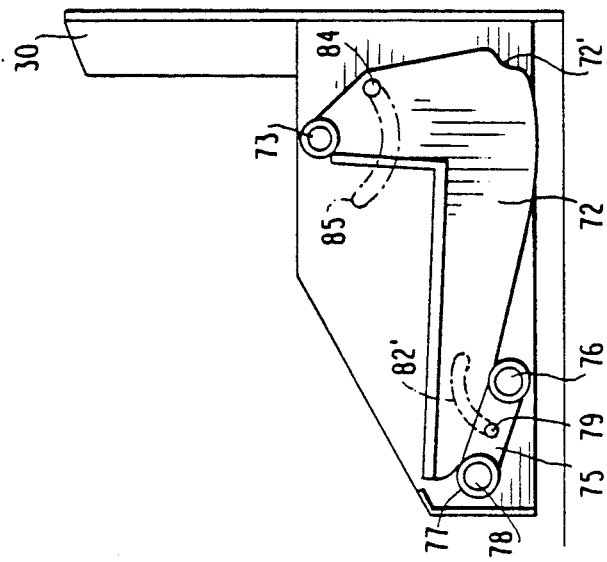
Figure 8C:
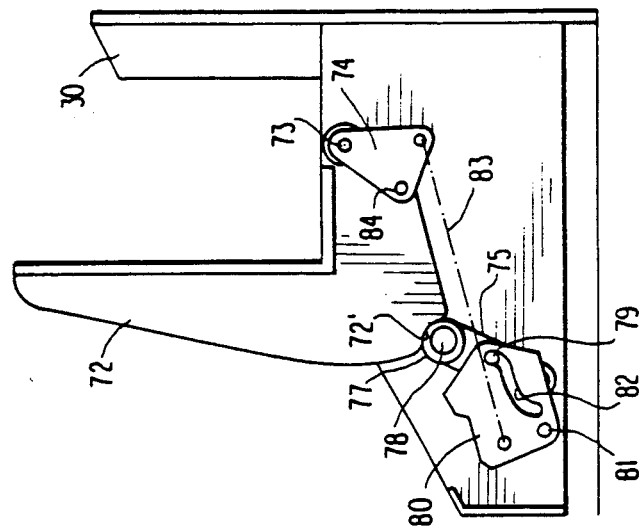
Figure 8B:
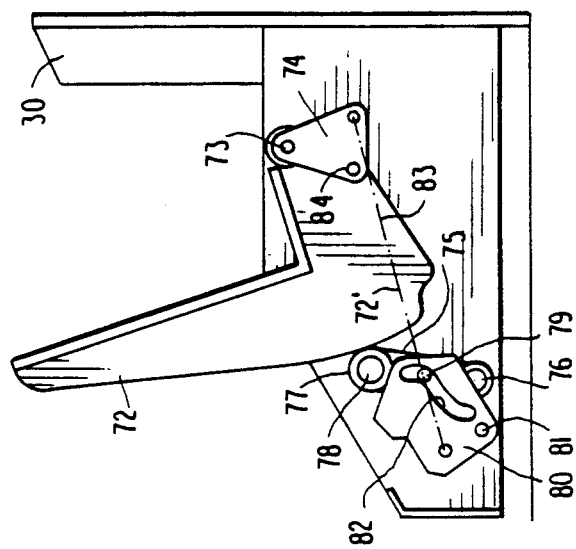
Figure 8A:
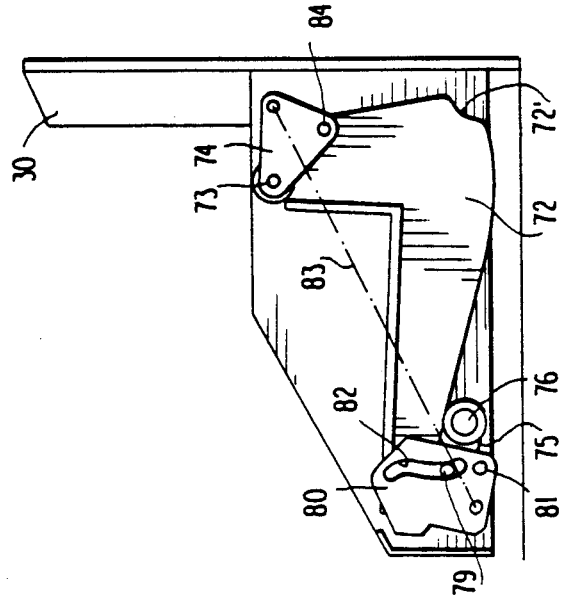

To raise the locking arm 72, the actuator 83 retracts from the extended position illustrated in FIGS. 4. 7(a) and 8(a). The dotted line 83 in FIGS. 8(a)-(c), illustrates the transitional position of the actuator from the fully retracted of FIG. 8(a) to the vehicle restraint position in FIG. 8(c). Thus, as illustrated best in FIGS. 7 and 8, the locking arm is caused to rotate by two forces. The first is the torque at the rear of the lever arm 74 through the pin 84. The second is the force exerted by latch cam 80 to the cam roller 79 on the latch arm 74. When the locking arm is rotated to the vertical position, the latch arm roller passes under the locking arm and then acts as a compressive strut. Such is illustrated in FIGS. 6, 7(c) and 8(c). In this position, the locking arm 72 is held in position and the vehicle s ICC bar 10 is trapped behind the locking arm. The truck is thus restrained from moving away from the dock surface 16.

FIG. 6 illustrates movement of the sensing bar 60 causes by rearward movement of the truck s ICC bar so that the device would be actuated. This sensing wand will be used to actuate a limit switch to indicate whether the ICC bar is in place for actuation of the device or for automatic actuation. While not shown, two additional limit switches could be used to sense when the actuator is fully extended or fully retraced. Those limit switches would be used to control the actuator and also to selectively actuate indicator lights required to display the status of the device to the dock attendant and truck driver.

As can be appreciated, in this second embodiment, the latch cam profile was designed to provide a high initial force to start raising the arm in place. A lower force is used to keep the latch arm roller in contact with the locking arm as it rotates. A high force at the end of travel provides positive engagement of the latch arm roller under the bottom of the locking arm. The advantage of this embodiment is that by moving pivot pin 44 to position at location 73, the forward projection arc of the end of the locking arm is reduced. This reduces the possibility of interference with other portions of the truck.

It is apparent that modification of this preferred embodiment may be practiced without departing from the essential scope of the invention.

I claim:

1. A device for restraining a vehicle having an ICC-bar at a loading dock comprising:
    a frame fixedly mountable at said loading dock,
    a restraining member pivotally mounted to said frame and movable relative to said frame from a lowered vehicle release position to an upward vehicle restraining position in which said ICC-bar is positioned between said loading dock and said restraining member;
    a first support bracket fixedly secured to said restraining member and having a cam profile surface;
    actuating means mounted to said frame having a linearly movable member;
    first follower means pivotally mounted to said frame and coupled to said actuating means and having a member following said cam profile to translate linear motion of said linearly movable member into rotational motion of said restraining member, whereby said restraining member is rotated from said vehicle release position to said vehicle restraining position by linear movement of said actuating means,
    second support bracket secured to said restraining member and having a cam profile therein, and second pivotally mounted follower means coupled to said actuating means and having a member disposed in the cam profile of said second support bracket to translate the linear motion of said linearly movable member into rotational motion whereby said restraining member is rotated from said release position to said restraining position by linear movement of said actuating means transmitted by both of said follower means.

2. The device of claim 1, further comprising means for pivoting said first and second follower means to said frame, and said cam profiles are configured such that when said restraining member is in a vehicle restraining position, any force applied to said restraining member tending to urge it into a vehicle release position is transmitted to said frame through said follower means without introducing a force component on said actuating means.

3. The device of claim 1, wherein said member disposed in said cam profiles comprises a roller for coupling said follower means to said support bracket, said roller journaled for rotation in one end of said follower means.

4. The device of claim 1, further comprising a sensor responsive to movement of said vehicle to determine the position on a portion of said vehicle to be contacted by said restraining member to prevent vehicle movement away from said dock face.

5. The device of claim 1, wherein said actuating means is positioned on said frame with each of follower means positioned on each side of said actuating means.

6. The device of claim 1, wherein said frame comprises a pair of parallel plates extending from said dock face and said restraining member is housing within said plates when in the vehicle release position.

7. The device of claim 1, wherein said actuator comprises an electro-mechanical lead screw.

8. The device of claim 1, further comprising sensor means to determine whether said restraining member is in the vehicle release position or the vehicle restraining position.

9. A system for restraining a vehicle having an ICC-bar to a loading dock comprising:
   a frame fixedly mounted on a surface to place it in an abutting relationship to a front face of said dock;
   a flat restraining member mounted for rotation on said fixedly mounted frame, said restraining member rotatable from a lowered vehicle release position to an upward vehicle restraining position in which said ICC-bar is positioned between said loading dock and said restraining member;
   a first support bracket fixed to said restraining member on an underside thereof, said bracket having a cam profile;
   linearly extending actuating means mounted to said frame and having an outwardly extendable member;
   first follower means pivotally mounted to said frame and coupled to said actuating means, said follower means having a member following said cam profile to translate linear outward motion of said actuating means into rotational motion of said restraining member, whereby said restraining member is rotated from said vehicle release position to said vehicle restraining by linear movement said actuating means;
   a second support bracket secured to said restraining member and having a cam profile therein, and second pivotally mounted follower means coupled to said actuating means and having a member disposed in the cam profile of said second support bracket to translate the linear motion of said linearly movable member into rotational motion whereby said restraining member is rotated from aid release position to said restraining position by linear movement of said actuating means transmitted by both of said follower means.

10. The device of claim 9, further comprising means for pivoting said first and second follower means to said frame, and said cam profiles are configured such that when said restraining member is in a vehicle restraining position, any force applied to said restraining member tending to urge it into a vehicle release position is transmitted to said frame through said follower means without introducing a force component on said actuating means.

11. The device of claim 9, wherein said member disposed in said cam profiles are comprises a roller for coupling said follower means to said support bracket, said roller journaled for rotation in one end of said follower means.

12. The device of claim 9, further comprising a sensor responsive to movement of said vehicle to determine the position on a portion of said vehicle to be contacted by said restraining member to prevent vehicle movement away from said dock face.

13. The device of claim 9, wherein said actuating means is positioned on said frame with each of follower means positioned on each side of said actuating means.

14. The device of claim 9, wherein said frame comprises a pair of parallel plates extending from said dock face and said restraining member is housing within said plates when in the vehicle release position.

15. The device of claim 9, wherein said actuator comprises an electro-mechanical lead screw.

16. The device of claim 9, further comprising sensor means to determine whether said restraining member is in the vehicle release position or the vehicle restraining position.

17. The device of claim 9, wherein said pivotally mounted follower means comprises a pair of arms, said arms pivoted to said frame at one end and sandwiching said support bracket at the opposite end, and said linearly movable member joined to one of said arms at an intermediate point on said arm.

18. A device for restraining a vehicle having an ICC-bar at a loading dock comprising:
   a frame fixedly mountable at said loading dock,
   a restraining member pivotally mounted to said frame and movable relative to said frame from a lowered vehicle release position to an upward vehicle restraining position in which said ICC-bar is positioned between said loading dock and said restraining member;
   a support bracket fixedly secured to said restraining member and having a cam profile surface;
   actuating means mounted to said frame having a linearly movable member;
   a lever arm pivotally mounted to said frame and attached to said restraining member, one end of said actuating means attached to said lever arm, said pivotally mounted follower means comprising a latch cam pivotally mounted to said frame having a second end of said actuating means attached thereto and said member comprises a latch arm having a cam follower roller bearing on the cam profile of said support bracket.

19. The device of claim 18, wherein said cam profile comprises a detent such that said latch arm defines a compressive strut member transferring loads from said restraining member to said frame.

20. The device of claim 18, wherein said latch cam has a cam slit therein, and said latch arm further comprises a cam following pin set in said cam slot, whereby rotation of said latch cam as said actuating means linearly moves is converted into pivotable movement of said latch arm.

21. The device of claim 18, further comprising a pin mounted on said lever arm and coupling said lever arm to said restraining member, said frame having a cut-out into which said pin is mounted whereby rotation of said lever arm is effectuated as said actuating means linearly moves guided by said cut-out.

* * * * *